(12) United States Patent
Tsuji

(10) Patent No.: US 10,652,387 B2
(45) Date of Patent: May 12, 2020

(54) INFORMATION DISPLAY METHOD AND DISPLAY CONTROL DEVICE

(71) Applicants: NISSAN MOTOR CO., LTD., Kanagawa (JP); RENAULT S.A.S., Boulogne-Billancourt (FR)

(72) Inventor: Masafumi Tsuji, Kanagawa (JP)

(73) Assignees: Nissan Motor Co., Ltd., Kanagawa (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/094,571

(22) PCT Filed: Apr. 20, 2016

(86) PCT No.: PCT/JP2016/062491
§ 371 (c)(1),
(2) Date: Oct. 18, 2018

(87) PCT Pub. No.: WO2017/183129
PCT Pub. Date: Oct. 26, 2017

(65) Prior Publication Data
US 2019/0109939 A1     Apr. 11, 2019

(51) Int. Cl.
*H04M 1/725* (2006.01)
*G06F 3/01* (2006.01)
(Continued)

(52) U.S. Cl.
CPC ......... *H04M 1/72572* (2013.01); *B60K 35/00* (2013.01); *B60R 11/02* (2013.01);
(Continued)

(58) Field of Classification Search
None
See application file for complete search history.

(56) References Cited

U.S. PATENT DOCUMENTS

| 6,208,932 B1 | 3/2001 | Ohmura et al. |
|---|---|---|
| 2002/0085043 A1 | 7/2002 | Ribak |

(Continued)

FOREIGN PATENT DOCUMENTS

| JP | H10-104003 A | 4/1998 |
|---|---|---|
| JP | 2002-166787 A | 6/2002 |

(Continued)

*Primary Examiner* — Yi Wang
(74) *Attorney, Agent, or Firm* — Osha Liang LLP

(57) ABSTRACT

A method of displaying information on a display of a display device via a display controller includes imaging a user of the display device using an imaging device integrated with the display device or provided around the display device, detecting a line of sight of the user from an image captured by the imaging device, determining whether the display exists within a central visual field region centered on the detected line of sight of the user or within a peripheral visual field region located outside the central visual field region, displaying notification information on the display in a first display form when the display exists within the central visual field region, and displaying the notification information on the display in a second display form when the display exists within the peripheral visual field region, the second display form having a higher abstraction level than that in the first display form.

8 Claims, 12 Drawing Sheets

(51) Int. Cl.
  *B60R 11/02*   (2006.01)
  *G06T 7/70*    (2017.01)
  *B60K 35/00*   (2006.01)
  *G06F 3/147*   (2006.01)
  *B60R 11/00*   (2006.01)
  *G06F 3/0481*  (2013.01)

(52) U.S. Cl.
  CPC .......... *B60R 11/0235* (2013.01); *G06F 3/012* (2013.01); *G06F 3/013* (2013.01); *G06F 3/147* (2013.01); *G06T 7/70* (2017.01); *B60K 2370/736* (2019.05); *B60R 2011/0005* (2013.01); *G06F 3/04817* (2013.01); *G06T 2207/30201* (2013.01)

(56) References Cited

U.S. PATENT DOCUMENTS

| | | | |
|---|---|---|---|
| 2012/0218295 A1 | 8/2012 | Hashikawa et al. | |
| 2013/0083025 A1 | 4/2013 | Gibson et al. | |
| 2013/0194110 A1* | 8/2013 | Kim | G02B 27/01 340/905 |
| 2014/0063055 A1* | 3/2014 | Osterhout | G06F 3/005 345/633 |
| 2014/0125583 A1 | 5/2014 | Aoki et al. | |
| 2014/0250395 A1 | 9/2014 | Tanaka | |
| 2015/0254508 A1* | 9/2015 | Kimura | G06K 9/0061 382/117 |
| 2016/0004321 A1 | 1/2016 | Takada et al. | |
| 2017/0220308 A1 | 8/2017 | Gibson et al. | |
| 2017/0269684 A1* | 9/2017 | Murai | B60R 1/00 |

FOREIGN PATENT DOCUMENTS

| | | |
|---|---|---|
| JP | 2002-225592 A | 8/2002 |
| JP | 2003-291688 A | 10/2003 |
| JP | 2004-077862 A | 3/2004 |
| JP | 2009-282937 A | 12/2009 |
| JP | 2011-79428 A | 4/2011 |
| JP | 5232922 B2 | 7/2013 |
| JP | 2014-094647 A | 5/2014 |
| JP | 2015-055999 A | 3/2015 |
| JP | 2015-058804 A | 3/2015 |
| JP | 5808435 B2 | 11/2015 |
| WO | 2013/048723 A1 | 4/2013 |

* cited by examiner

INFORMATION DISPLAY METHOD AND DISPLAY CONTROL DEVICE

BACKGROUND

Technical Field

The present invention relates to a method of displaying information and a display control device.

Related Art

A vehicular display device is known which controls the display unit of a mobile terminal to display the contents (see Patent Document 1, for example). The mobile terminal is disposed at a predetermined location in a vehicle. In the vehicular display device described in Patent Document 1, a reference position in the vehicle and positions of the driver's eyes are recognized by an imaging unit of the mobile terminal, and at least one of the display size and display position of the contents is changed in accordance with the positions of the driver's eyes with respect to the reference position.

[Patent Document 1] JP2014-94647A

SUMMARY OF INVENTION

In the vehicular display device described in Patent Document 1, the display form of the information displayed on the display unit is not changed in relation to the line of sight of the driver. Accordingly, materialized information may be displayed on the display device existing in a peripheral visual field region of the driver, or only abstracted information may be displayed on the display device existing in a central visual field region of the driver.

A method of displaying information according to one or more embodiments of the present invention, and a display control device according to one or more embodiments of the present invention allows information to be displayed on a display device while appropriately set in relation to the line of sight of the user of the display device.

One or more embodiments of the present invention includes imaging the user of a display device using an imaging device integrated with the display device or provided around the display device, detecting a line of sight of the user from a captured image, displaying notification information on a display in a first display form when the display exists within a central visual field region, and displaying the notification information on the display in a second display form when the display exists within a peripheral visual field region. The second display form has a higher abstraction level than that in the first display form.

According to one or more embodiments of the present invention, the abstraction level of the display form of the notification information is made different in accordance with whether the display device falls within the central visual field region or the peripheral visual field region of the user and the information to be displayed on the display device can thereby be appropriately set in relation to the line of sight of the user of the display device.

DETAILED DESCRIPTION

Figure 1:
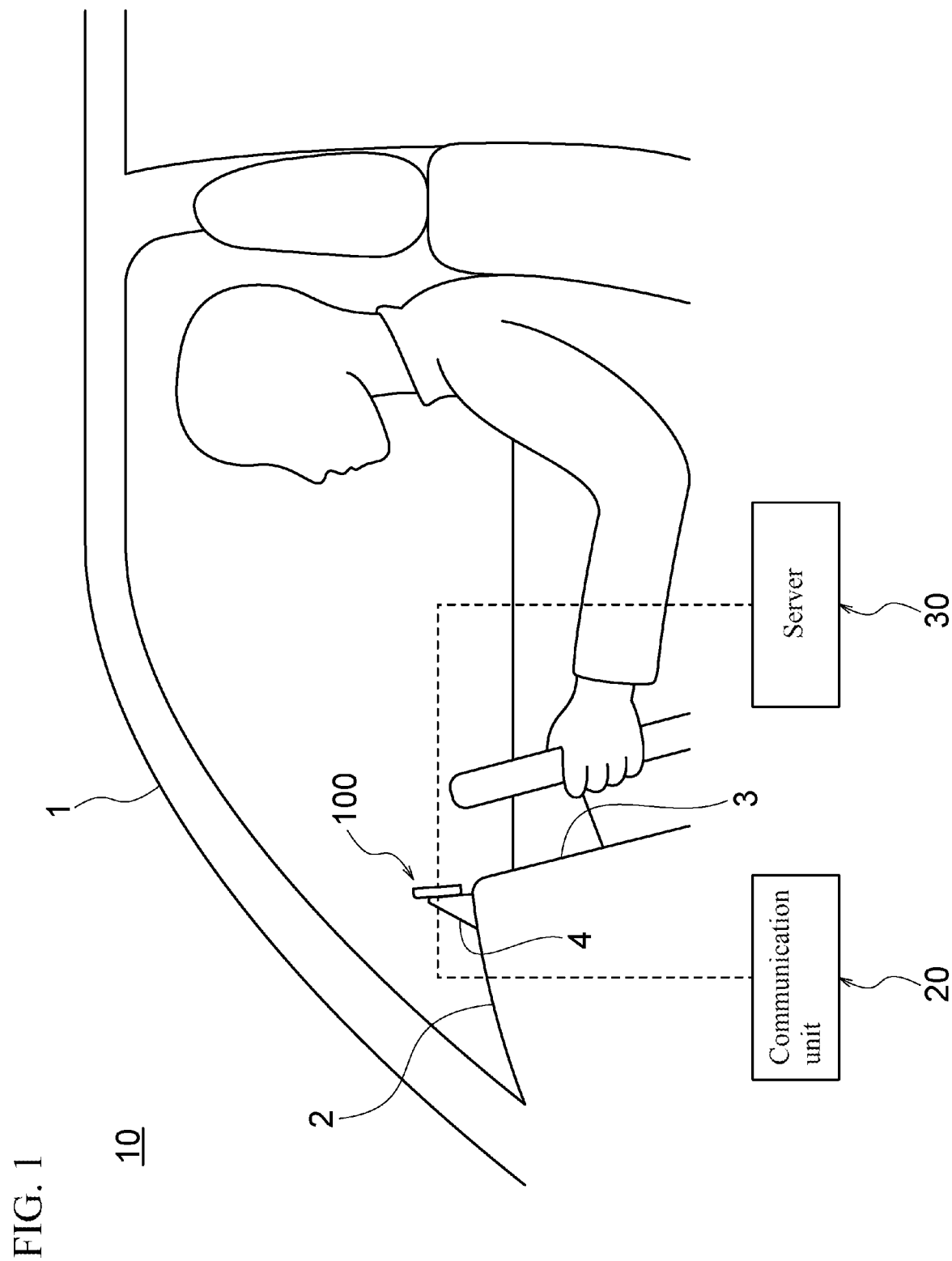
FIG. 1 is a diagram schematically illustrating a vehicular information display system according to one or more embodiments of the present invention.

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 is a diagram schematically illustrating a vehicular information display system 10 according to one or more embodiments of the present invention. The vehicle information display system 10 illustrated in the figure is a system for displaying information on a display unit 101 (see FIG. 2) of a display device 100 in accordance with the relationship between the installation location of the display device 100 and the visual field of the driver. The display device 100 is installed at an arbitrary location in front of the driver's seat in a vehicle 1. The vehicular information display system 10 comprises the display device 100, a communication unit 20, and a server 30. The display device 100 can be fixed by a fixing device 4 to a location on the dashboard 2 of the vehicle, in front of the meter panel 3, or the like.

Figure 2:
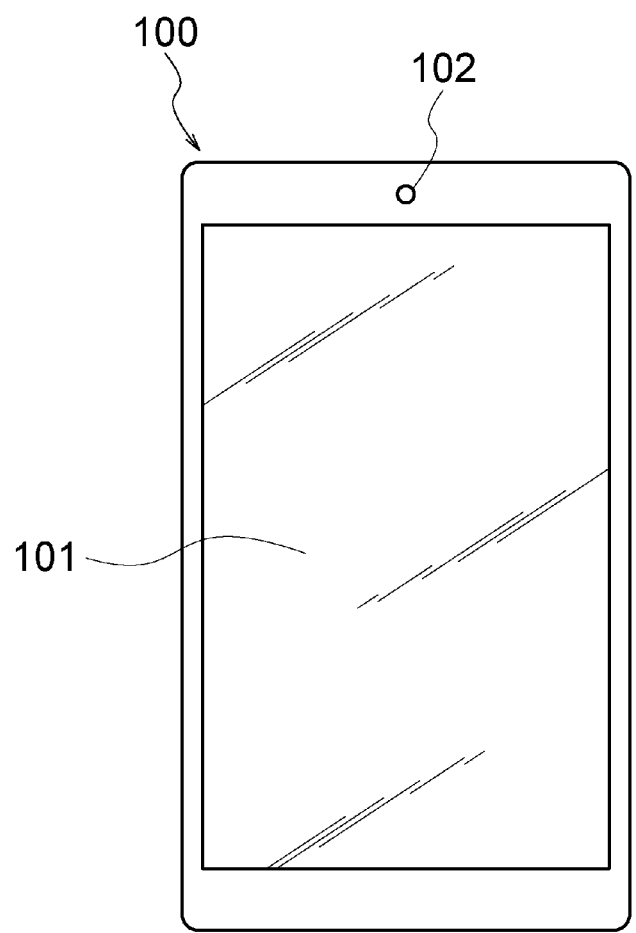
FIG. 2 is a view illustrating the front surface of a display device of FIG. 1.

FIG. 2 is a view illustrating the front surface of the display device 100. As illustrated in the figure, the display device 100 is a mobile terminal device comprising the display unit 101 and an imaging device 102. Examples of the display device 100 include mobile terminals such as a smartphone, a tablet terminal, and a PDA. In one or more embodiments of the present invention, the display device 100 is a smartphone, the display unit 101 is a display such as a liquid crystal display and an organic EL display, and the imaging device 102 is an in-camera. The display device 100 is installed with application software for executing a process of displaying information on the display unit 101 in accordance with the relationship between the visual field of the driver and the installation location of the display device 100. The image to be displayed on the display unit 101 in accordance with the relationship between the visual field of the driver and the installation location will be described later.

The communication unit 20, which is connected to an in-vehicle network such as a controller area network (CAN), receives vehicle information from on-board devices such as an engine control unit or electronic control unit (ECU)). Examples of the vehicle information include the speed, engine speed, brake state, steering state, captured images from on-board cameras, winker state, On/OFF of headlamp and width indicator switches, and ON/OFF of ignition switch. The communication unit 20, which is connected to the display device 100 via wireless communication such as Bluetooth (registered trademark) or wired communication such as wired LAN, transmits the vehicle identification information such as the vehicle identification number, the vehicle information received from the on-board devices, and other necessary information to the display device 100.

The server 30, which is connected to a wireless communication network, transmits information to the display device 100 and receives information from the display device 100. Examples of the wireless communication network include a communication network for mobile phones, such as long term evolution (LTE) and 3G a wireless communication network such as WiMAX (registered trademark), and a wireless communication network for an intelligent transportation system, such as beacon. In one or more embodiments of the present invention, the server 30 acquires the vehicle identification information, the vehicle information, and the information on the display device 100 from the display device 100 and transmits information necessary for information display processing (referred to as "display processing information," hereinafter) to the display device 100. Allocation of processing and functions between the server 30 and the display device 100 may be appropriately set. For example, the server 30 and the display device 100 may be configured to cooperate with each other so that the server 30 creates the information to be displayed on the display unit 101 of the display device 100 on the basis of the information acquired from the display device 100 and transmits the created information to the display device 100.

Figure 3:
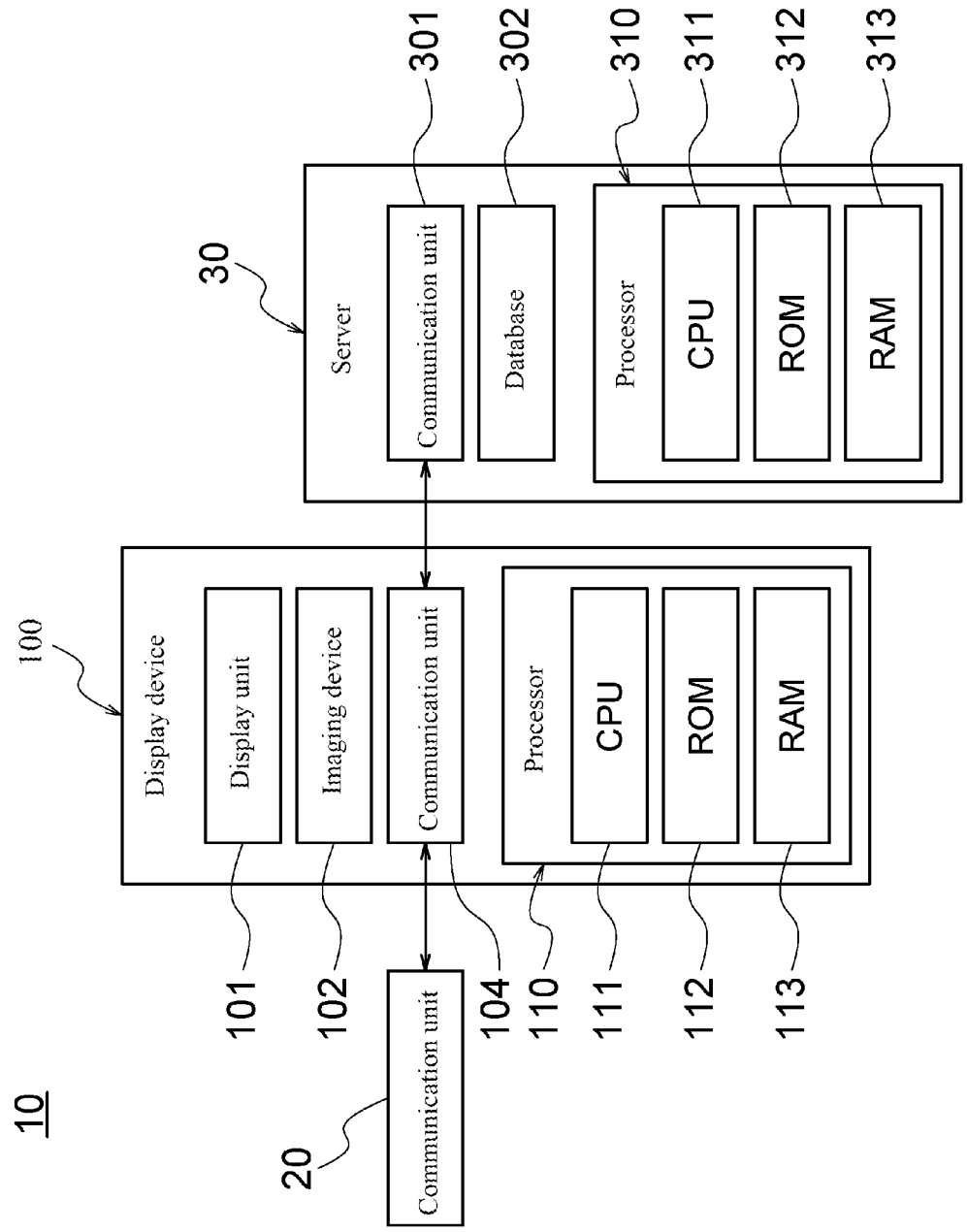
FIG. 3 is a block diagram illustrating the vehicular information display system of FIG. 1.

FIG. 3 is a block diagram illustrating a schematic configuration of the vehicular information display system 10. As illustrated in the figure, the display device 100 includes a communication unit 104 and a processor 110 in addition to the above-described display unit 101 and imaging device 102. The communication unit 104, which receives the above-described vehicle identification information and vehicle information and other necessary information from the communication unit 20, transmits these information items to the server 30 and receives the display processing information and other necessary information from the server 30.

The processor 110 is a computer comprising a ROM 112 that stores a display control program, a CPU 111 as an operation circuit that executes the display control program stored in the ROM 112, and a RAM 113 that serves as an accessible storage device. The processor 110 has functions of executing an information acquisition process, a line-of-sight detection process, a visual field region setting process, a display information creation process, and a display control process and executes each process by cooperation of software for implementing the process and the above-described hardware.

In the information acquisition process, the processor 110 acquires the vehicle information and the vehicle identification information from the communication unit 20, acquires the display processing information from the server 30, and acquires the captured image information from the imaging device 102. The line-of-sight detection process, the visual field region setting process, the display information creation process, and the display control process will be described later.

The server 30 comprises a communication unit 301, a database 302, and a processor 310. The communication unit 301 receives the vehicle identification information, the vehicle information, and other necessary information from the communication unit 104 of the display device 100 and transmits the display processing information and other necessary information to the communication unit 104 of the display device 100. The database 302 stores the display processing information.

The processor 310 is a computer comprising a ROM 312 that stores a display control program, a CPU 311 as an operation circuit that executes the display control program stored in the ROM 312, and a RAM 113 that serves as an accessible storage device. The processor 310 has functions of executing an information acquisition process and a display processing information extraction process and executes each process by cooperation of software for implementing the process and the above-described hardware.

Figure 4:
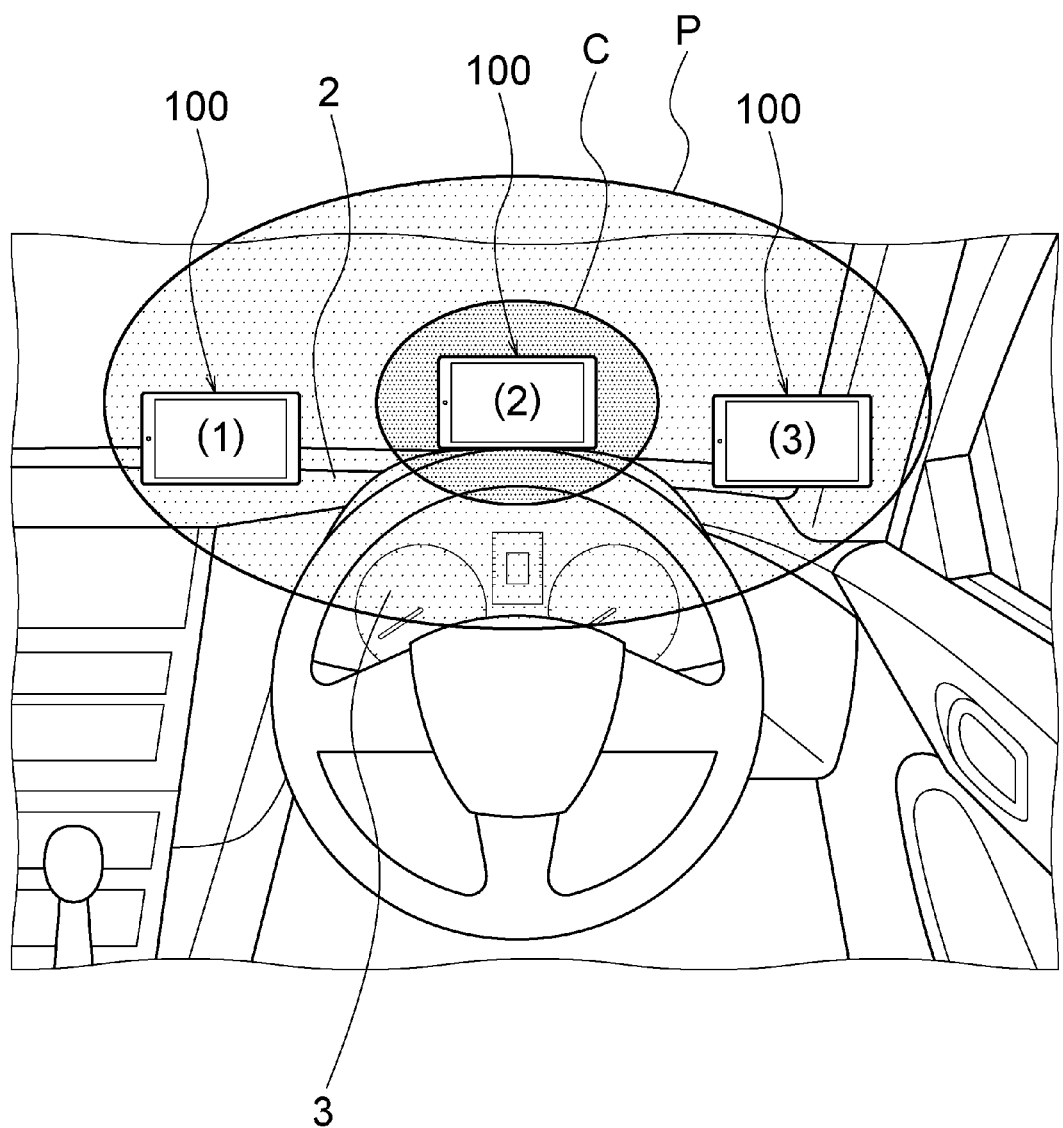
FIG. 4 is a view for describing a line-of-sight detection process, an estimation process, and an installation location determination process executed by a processor of FIG. 3.

FIG. 4 is a view for describing the line-of-sight detection process and the visual field region setting process executed by the processor 110. As illustrated in FIG. 4, when the display device 100 is installed on the dashboard 2 in front of the driver, the driver's face falls within the field angle of the imaging device 102 which is an in-camera. In particular, the display device 100 installed on the dashboard 2 just in front of the driver exists within in a central visual field region C of the driver. When the display device 100 is installed on the dashboard 2 at its right end as viewed from the driver or on the dashboard 2 around its center (on the left side as viewed from the driver), the display device 100 exists within a peripheral visual field region P of the driver.

In the line-of-sight detection process, the processor 110 analyzes the face image included in the image captured using the imaging device 102 thereby to detect the line of sight of the driver. An example of a method of detecting the line of sight of the driver will be described below.

In the line-of-sight detection method according to this example, image processing is performed on the face image acquired by the imaging device 102 to extract feature points of the face, and the line of sight is extracted from the positional relationship between each site of the face and the eyeballs. First, a skin color region is extracted from the input image on the basis of the luminance information and chroma information of the input image from the imaging device 102.

Subsequently, the inner corners and outer corners of eyes and the nostrils are extracted on the basis of the luminance information and chroma information of the input image. Next, pupils are extracted using a separability filter. Then, the two points of the extracted outer corners of eyes and an intermediate point between the two points of the extracted nostrils (i.e. total three points) are used to create a plane corresponding to the face, and the three-dimensional position and direction of the plane in the camera coordinate system are detected.

Finally, to extract the line of sight, a local coordinate system in association with the face is first set up. In this local coordinate system, the X-axis represents a straight line that passes through the extracted inner and outer corners of eyes, and Y-axis represents a straight line that is orthogonal to the X-axis and passes through one of the inner corners of eyes. The difference between the center position $(X_i, Y_i)$ between the extracted pupils and the center position $(X_0, Y_0)$ between the pupils when viewing frontward (pupil movement amount) $(X_0-X_i, Y_0-Y_i)$ is calculated, and the line of sight is calculated on the basis of the pupil movement amount and the eyeball radius (default value).

In the visual field region setting process, the processor 110 sets the central visual field region C and the peripheral visual field region P. The central visual field region C is set as a region of a predetermined angle (e.g. an angle of 4 to 20° that is said to be an effective visual field or a recognition limit of characters) from side to side and up and down with respect to the line of sight as the center detected in the line-of-sight detection process. The peripheral visual field region P is set as a region (except for the central visual field region C) of a predetermined angle (e.g. 100° corresponding to the maximum view angle) from side to side with respect to the line of sight as the center detected in the line-of-sight detection process, a predetermined angle (e.g. 50° corresponding to the maximum view angle) above the line of sight, and a predetermined angle (e.g. 75° corresponding to the maximum view angle) below the line of sight.

In the installation location determination process, the processor 110 determines whether or not the display device 100 exists within the central visual field region C. In this process, a determination is made as to whether or not the straight line passing through the pupil extracted by the line-of-sight detection process and the imaging device 102 passes through the central visual field region C set in the visual field region setting process.

Figure 5:
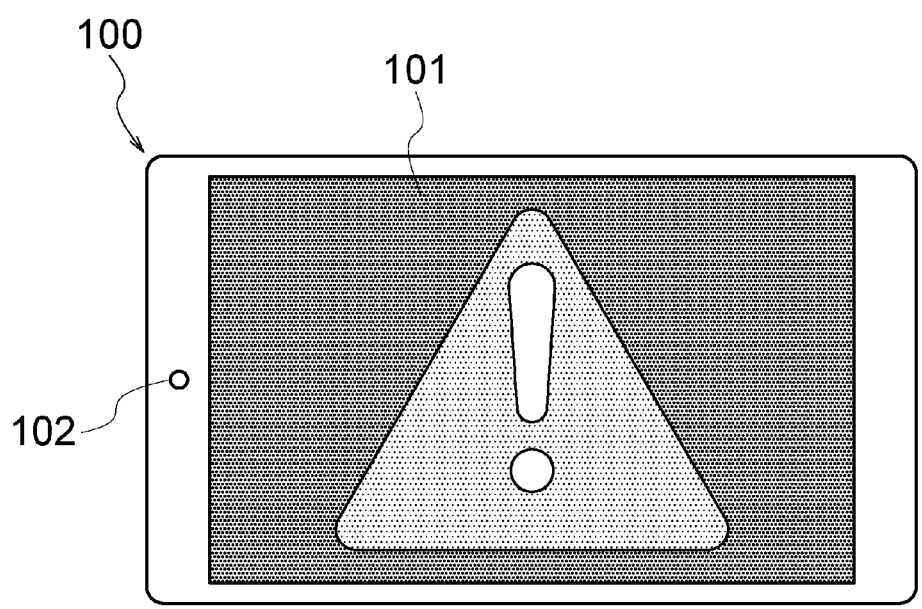
FIG. 5 is a view for describing a display information creation process and a display control process executed by the processor of FIG. 3.
Figure 6:
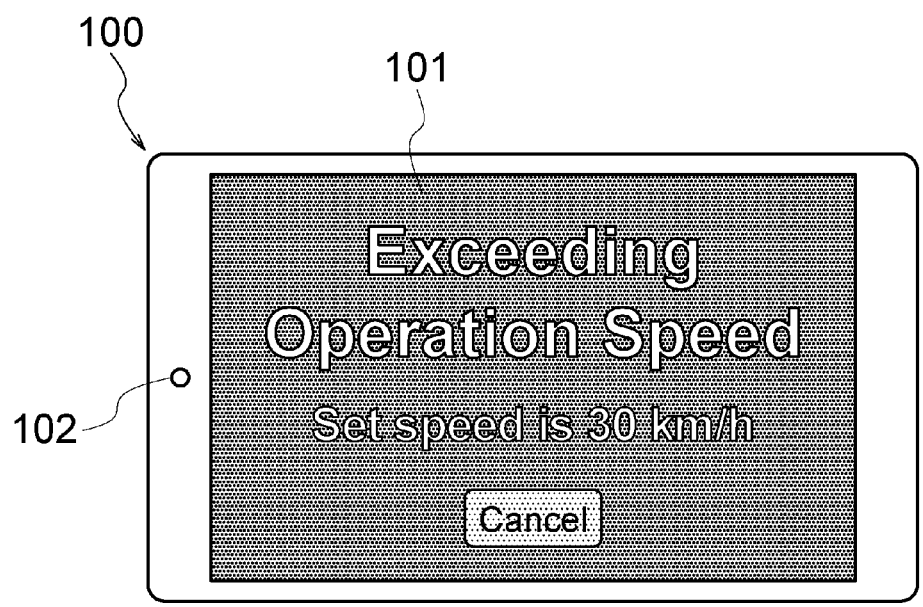
FIG. 6 is a view for describing the display information creation process and the display control process executed by the processor of FIG. 3.

FIGS. 5 and 6 are views for describing the display information creation process and the display control process executed by the processor 110. When the display device 100 exists outside the central visual field region C, the processor 110 creates abstracted display information such as an icon (referred to as "abstracted information," hereinafter), as illustrated in FIG. 5, in the display information creation process and controls the display unit 101 to display the created abstracted information in the display control process. On the other hand, when the display device 100 exists inside the central visual field region C, the processor 110 creates materialized display information such as a text (referred to as "materialized information," hereinafter), as illustrated in FIG. 6, in the display information creation process and controls the display unit 101 to display the created materialized information in the display control process.

Examples of the abstracted or materialized display information include a warning display, such as over speed and sudden braking, and a display of information about the on-board devices, such as an air conditioner and audio. For example, as illustrated in FIGS. 5 and 6, when the display unit 101 is controlled to display a warning display of over speed, an icon that is recognizable information even in a visual field regarded as the recognition limit of symbols is displayed as the abstracted information, or a text that is recognizable information in a visual field regarded as the recognition limit of characters is displayed as the materialized information.

Figure 7:
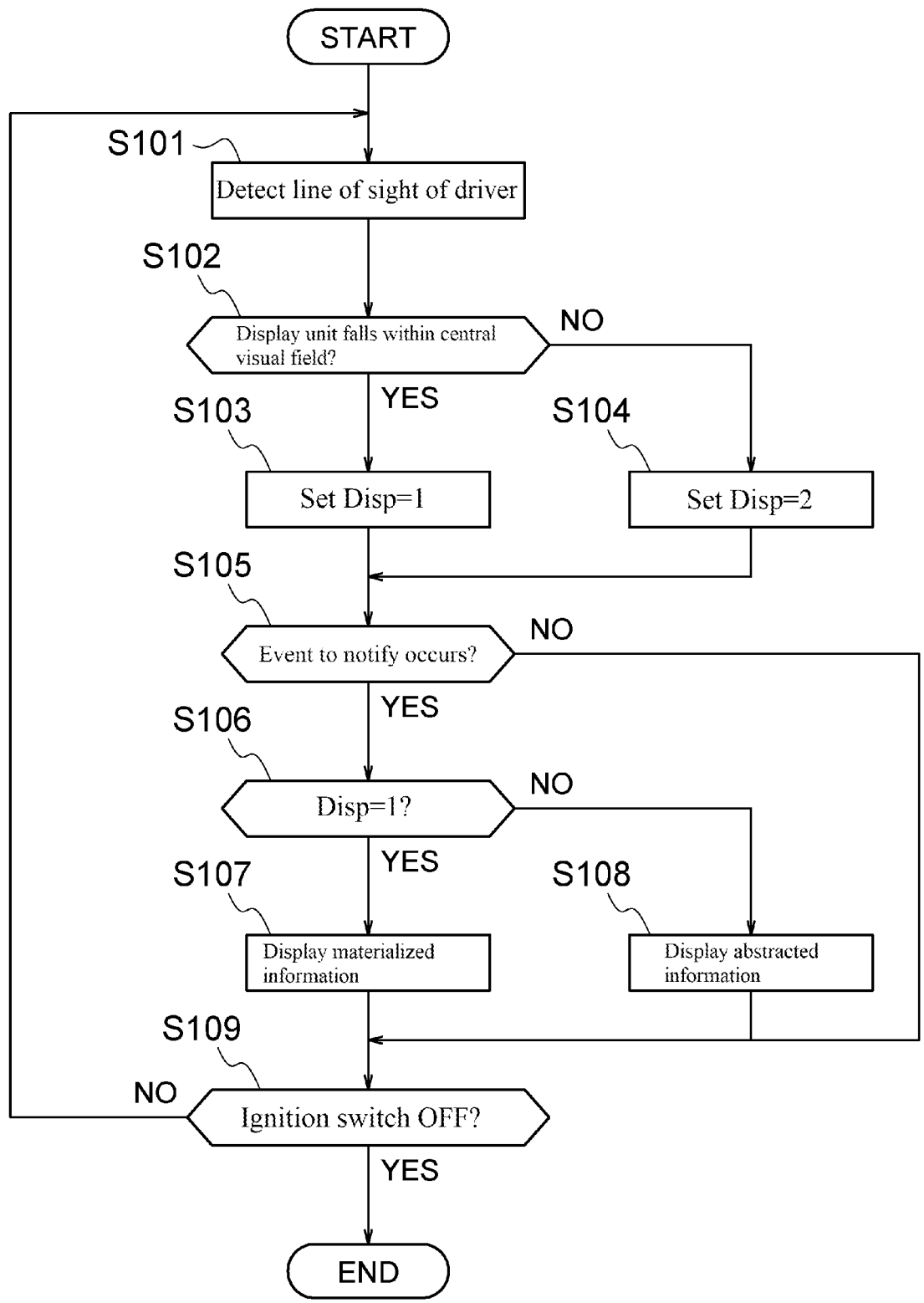
FIG. 7 is a flowchart illustrating the control procedure of an image display process executed by the vehicular information display system according to one or more embodiments of the present invention.

FIG. 7 is a flowchart illustrating the control procedure of an image display process executed by the vehicular information display system 10 according to one or more embodiments of the present invention. The processing routine illustrated in the flowchart of this figure is started when the application software installed in the display device 100 is activated. During execution of this processing routine, the processor 110 acquires the vehicle information and the vehicle identification information from the communication unit 20 and acquires the captured image information from the imaging device 102.

First, the processor 110 detects the line of sight of the driver on the basis of the image captured by the imaging device 102 (step S101). Subsequently, the processor 110 sets the central visual field region C centered on the line of sight detected in step S101 and determines whether or not the straight line passing through the driver's pupil extracted in step S101 and the imaging device 102 passes through the central visual field region C (step S102). An affirmative determination in step S102 is followed by step S103 while a negative determination in step S102 is followed by step S104.

In step S103, the processor 110 sets Disp=1 as the setting of information to be displayed on the display unit 101. On the other hand, in step S104, the processor 110 sets Disp=2 as the setting of information to be displayed on the display unit 101.

After steps S103 and S104, the processor 110 determines whether or not an event to notify by displaying an icon, text, or the like on the display unit 101 occurs, on the basis of the vehicle information acquired from the communication unit 20 (step S105). An affirmative determination in step S105 is followed by step S106 while a negative determination in step S105 is followed by step S109.

In step S106, the processor 110 determines whether or not the setting of information to be displayed on the display unit 101 is Disp=1. An affirmative determination in step S106 is followed by step S107 while a negative determination in step S106 is followed by step S108.

In step S107, the processor 110 creates text information as the materialized information and controls the display unit 101 to display the text. On the other hand, in step S108, the processor 110 creates image information of an icon as the abstracted information and controls the display unit 101 to display the icon.

After steps S107 and S108, the processor 110 determines whether or not the ignition switch is OFF (step S109). When an affirmative determination is made in step S109, the processor 110 terminates the application software and terminates the process. On the other hand, when a negative determination is made in step S109, the routine returns to step S101 and the processes of steps S101 to S110 are repeated.

As described above, in the vehicular information display system 10 according to one or more embodiments of the present invention, the imaging device 102 integrated with the display device 100 is controlled to image the driver as a user of the display device 100, and the line of sight of the driver is detected from the captured image. Then, a determination is made as to whether the display unit 101 of the display device 100 exists within the central visual field region C centered on the detected line of sight of the driver or within the peripheral visual field region P outside the central visual field region C. When the display unit 101 exists within the central visual field region C, notification information such as warning information is displayed on the display unit 101 in the first display form. On the other hand, when the display unit 101 exists within the peripheral visual field region P, notification information such as warning information is displayed on the display unit 101 in the second display form which has a higher abstraction level than that in the first display form. This can suppress an increase in the recognition time for the driver to recognize the notification information displayed on the display device 100 existing in the peripheral visual field region P. It is also possible to suppress shortage of the amount of information required by the driver with regard to the notification information displayed on the display device 100 existing within the central visual field region C. Thus, an effect is obtained that the notification information to be displayed on the display device 100 can be appropriately set in relation to the line of sight of the driver.

Moreover, in the vehicular information display system 10 according to one or more embodiments of the present invention, the first display form of the notification information displayed on the display unit 101 includes a text and it is therefore possible to satisfy the amount of information required by the driver with regard to the notification information to be recognized in the central visual field region C. On the other hand, the second display form of the notification information displayed on the display unit 101 includes an icon and it is therefore possible to shorten the recognition time for the driver to recognize the notification information displayed on the display device 100 existing in the peripheral visual field region P.

Furthermore, in the vehicular information display system 10 according to one or more embodiments of the present invention, the display device 100 is disposed in front of the driver's seat in the vehicle, and the notification information displayed on the display unit 101 is information to be notified to the driver. Thus, the notification information recognized in the central visual field of the driver who drives while facing front is the materialized information such as a text, which satisfies the amount of information required by the driver. On the other hand, the notification information recognized in the peripheral visual field of the driver who drives while facing front is the abstracted information such as an icon, which enables the driver to recognize it in a short time.

Figure 8:
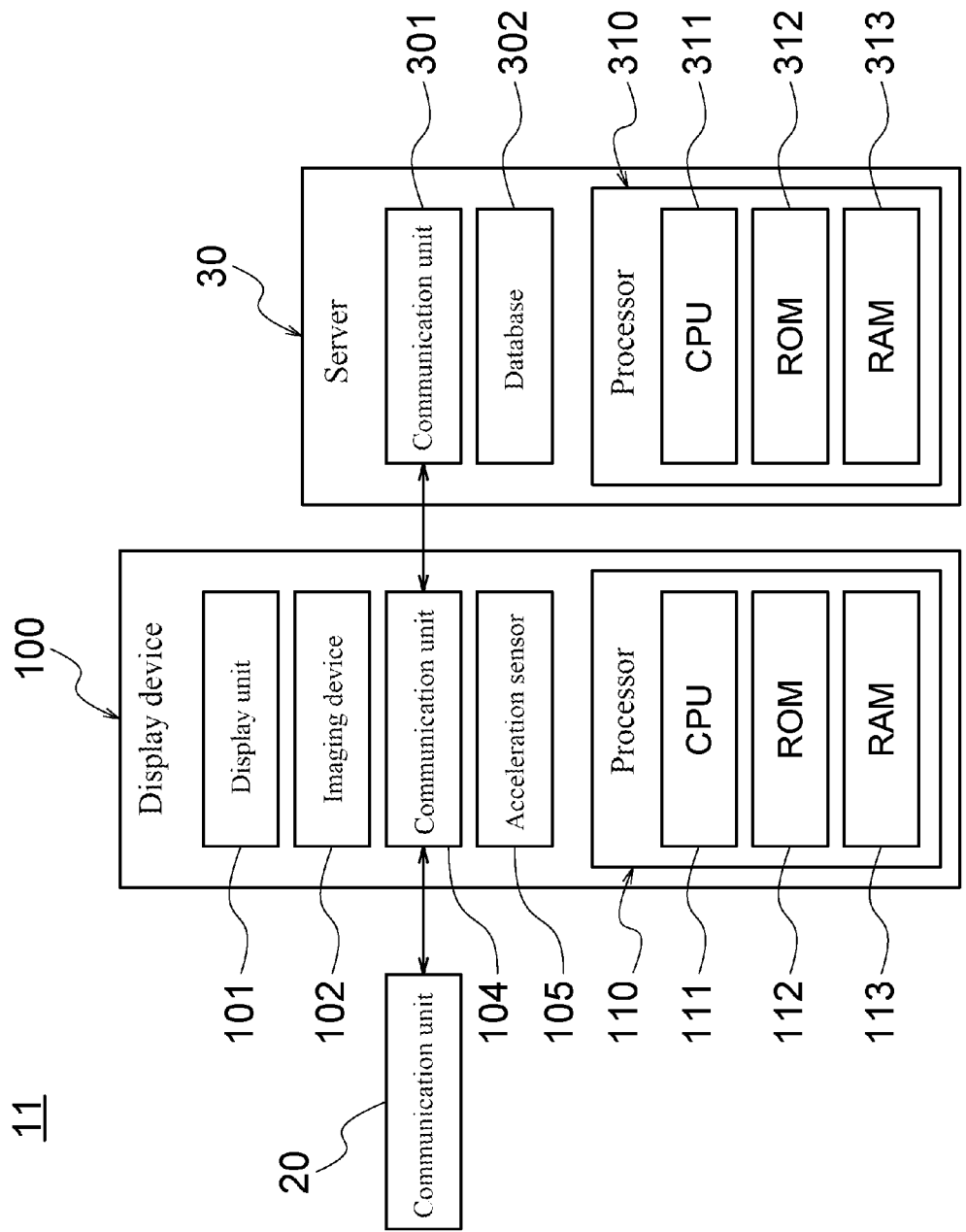
FIG. 8 is a block diagram illustrating the schematic configuration of a vehicular information display system according to one or more embodiments of the present invention.

FIG. 8 is a block diagram illustrating the schematic configuration of a vehicular information display system 11 according to one or more embodiments of the present invention. Description of the vehicular information display system 10 similar to the above described embodiments will be omitted and the above description will be borrowed herein.

As illustrated in FIG. 8, the display device 100 includes an acceleration sensor 105 in addition to the above-described display unit 101, imaging device 102, communication unit 104, and processor 110. The acceleration sensor 105, which is a micro electro mechanical system (MEMS) triaxial acceleration sensor or other appropriate sensor, can measure the acceleration in three directions of X-axis, Y-axis, and Z-axis and can also measure the gravity (static acceleration). The communication unit 104 of one or more embodiments of the present invention, which receives the above-described vehicle identification information, vehicle information, and other necessary information from the communication unit 20, transmits these information items to the server 30 and receives the display processing information and other necessary information from the server 30. The processor 110 has a function of executing an installation location estimation process in addition to the above-described functions of executing the information acquisition process, the line-of-sight detection process, the visual field region setting process, the display information creation process, and the display control process.

Figure 9:
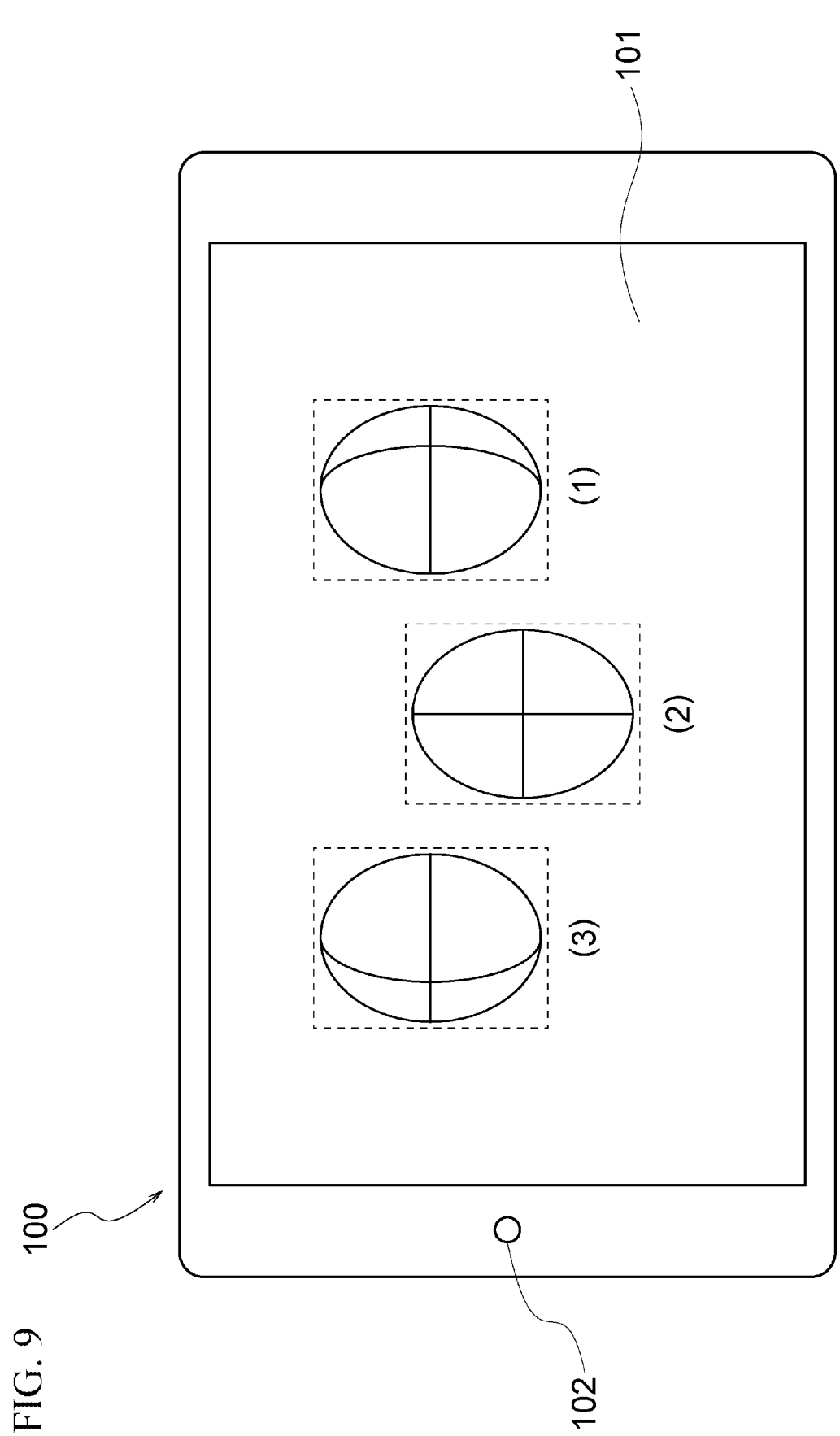
FIG. 9 is a view for describing an installation location estimation process executed by a processor of FIG. 8.

FIGS. 4 and 9 are views for describing the installation location estimation process executed by the processor 110. As illustrated in FIG. 4, when the display device 100 is installed on the dashboard 2 in front of the driver, the driver's face falls within the field angle of the imaging device 102, which is an in-camera, and the captured image thus includes the driver's face.

In the following description, the installation location on the dashboard 2 around its center (on the left side as viewed from the driver) in the right-hand drive vehicle will be referred to as an installation location (1), the installation location on the dashboard 2 just in front of the driver will be referred to as an installation location (2), and the installation location on the dashboard 2 on the right side as viewed from the driver will be referred to as an installation location (3). The display device 100 installed at any of the installation location (1) and the installation location (3) exists within the peripheral visual field region P of the driver facing front. On the other hand, the display device 100 installed at the installation location (2) exists within the central visual field region C of the driver facing front. It is assumed that the display device 100 in a rectangular shape is installed sideways. It is also assumed that the imaging device 102 is located on the right or left side of the display unit 101.

FIG. 9 is a view illustrating positions at which the driver's face is displayed and directions of the driver's face when the image captured by the imaging device 102 is displayed on the display unit 101 of the display device 100 installed at the installation locations (1) to (3). As illustrated in the figure, the image captured by the imaging device 102, which is an in-camera, is displayed as a mirror image on the display unit 101.

When the display device 100 is installed at the installation location (3) on the upper right as viewed from the driver, the display position of the driver's face on the display unit 101 is reversed from side to side as compared with when the display device 100 is installed at the installation location (1) on the upper left as viewed from the driver. When the display device 100 is installed at the installation location (1), the driver's face is displayed slightly to the right of the center of the display unit 101.

When the display device 100 is installed at the installation location (1) on the left side as viewed from the driver, the driver's face is displayed on the display unit 101 in a direction (rightward) in which the left face appears forward, while when the display device 100 is installed at the installation location (3) on the upper right as viewed from the driver, the driver's face is displayed on the display unit 101 in a direction (leftward) in which the right face appears forward. When the display device 100 is installed at the installation location (2) facing the driver, the driver's face is displayed on the display unit 101 in the front direction.

As described above, correlative relationships exist between the installation location of the display device 100 and the position and direction of the driver's face in the image captured by the imaging device 102. When the display device 100 is installed at any of the installation locations (1) to (3), it is envisaged that the driver adjusts the direction of the display device 100 so that the driver can easily see the display unit 101. Thus, when the display device 100 is installed at any of the installation locations (1) to (3), no identifiable difference may occur in the position of the driver's face in the image captured by the imaging device 102. The processor 110 therefore acquires the imaging information of the imaging device 102 (ranging information at the time of AF control and captured images) in the information acquisition process, determines the direction of the driver's face in the image, which is captured by the imaging device 102, in the installation location estimation process, and estimates the installation location of the display device 100 on the basis of the determination result.

Figure 10:
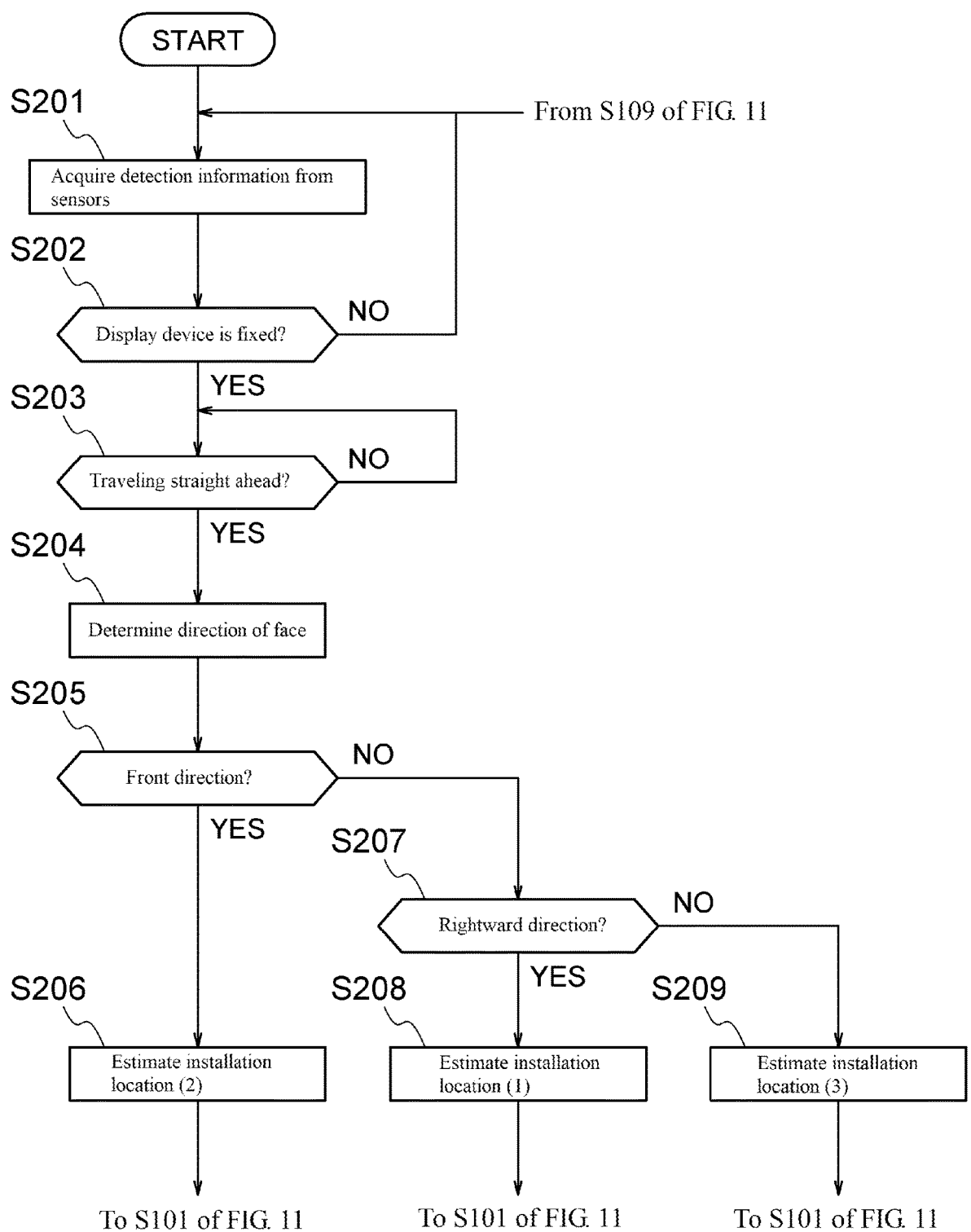
FIG. 10 is a flowchart illustrating the control procedure of an information display process executed by the vehicular information display system according to one or more embodiments of the present invention.
Figure 11:
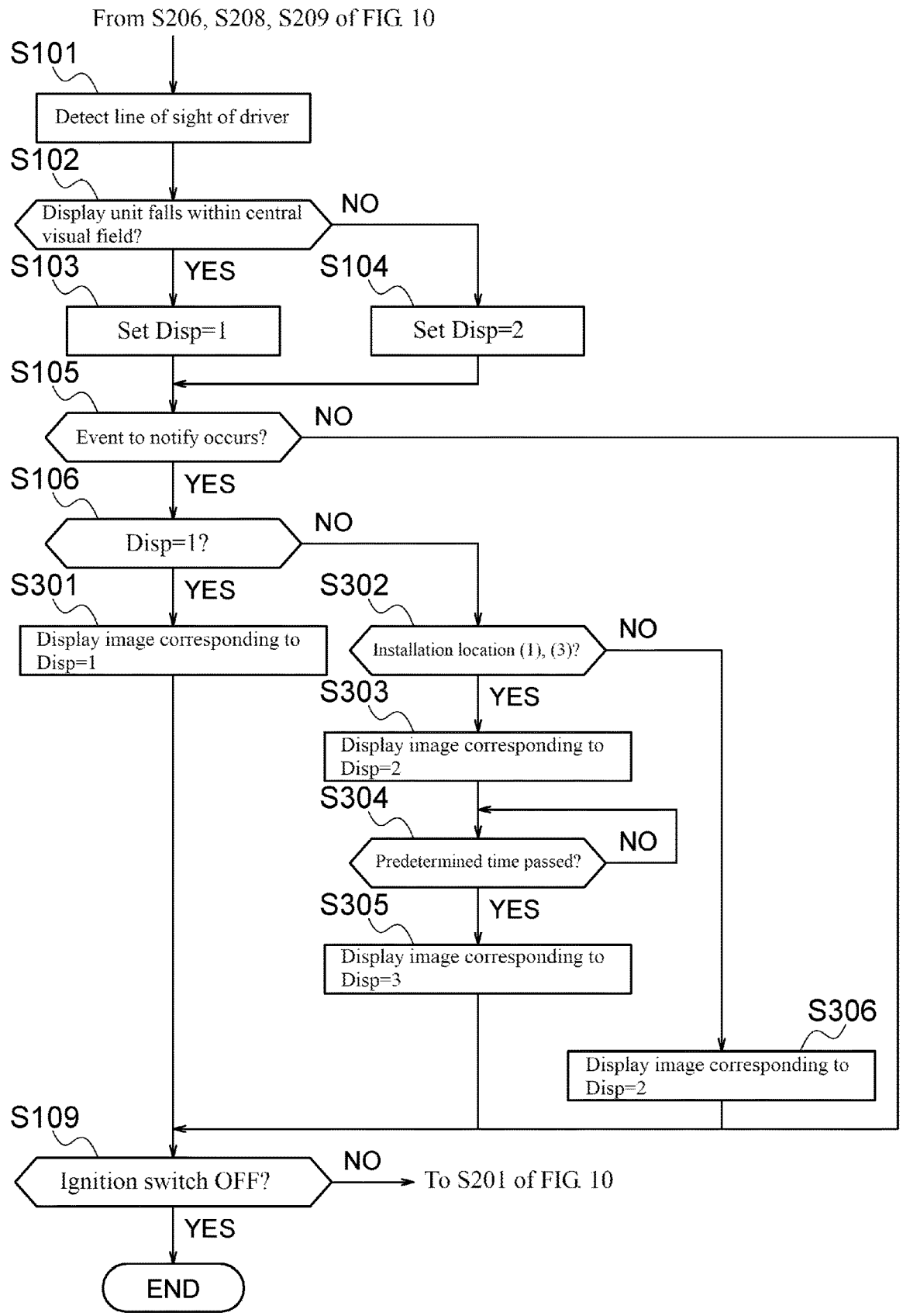
FIG. 11 is a flowchart illustrating the control procedure of the information display process executed by the vehicular information display system according to one or more embodiments of the present invention.

FIGS. 10 and 11 are flowcharts illustrating the control procedure of an image display process executed by the vehicular information display system 11 according to one or more embodiments of the present invention. The processing routine illustrated in the flowcharts of these figures is started when the application software installed in the display device 100 is activated. Description of similar procedures as in the vehicular information display system 10 described above will be omitted and the above description will be borrowed herein.

In the image display process according to one or more embodiments of the present invention, first, a process of estimating the installation location of the display device 100 is executed (steps S201 to S209). In step S201, the processor 110 acquires detection information of the sensors equipped in the display device 100. The detection information of the sensors acquired in this step includes the acceleration information detected by the acceleration sensor 105.

Subsequently, the processor 110 determines whether or not the display device 100 is in a fixed state on the basis of the acceleration information acquired in step S201 (step S202). In this step, the processor 110 determines whether or not the acceleration in the direction of gravity (Z-axis direction) detected by the acceleration sensor 105 is equal to or less than a predetermined threshold. When a negative determination is made in this step, the routine returns to step S201, while an affirmative determination in this step is followed by step S203.

In step S203, the processor 110 determines whether or not the vehicle 1 is traveling straight ahead, on the basis of the vehicle speed and the steering angle. An affirmative determination in this step is followed by step S204, while when a negative determination is made, the process of step S203 is repeatedly executed. In step S203, the processor 110 determines whether or not the vehicle speed is equal to or more than a predetermined threshold and the steering angle is equal to or less than a predetermined threshold. The threshold of vehicle speed as used herein is set to a value, such as 10 km/h, with which a determination can be made that the vehicle 1 is traveling. The threshold of steering angle is set to a value, such as 10°, with which a determination can be made that the vehicle 1 is traveling straight ahead.

In step S204, the processor 110 analyzes the image captured by the imaging device 102 thereby to determine the direction of the driver's face in the image captured by the imaging device 102. Then, the processor 110 determines whether or not the direction of the driver's face determined in step S204 is the front direction (step S205). An affirmative determination in this step is followed by step S206 while a negative determination in this step is followed by step S207.

In step S207, the processor 110 determines whether or not the direction of the driver's face determined in step S204 is rightward (the direction in which the left face appears forward). An affirmative determination in this step is followed by step S208 while a negative determination in this step is followed by step S209.

In step S206, the processor 110 estimates the installation location of the display device 100 as the installation location (2). On the other hand, in step S208, the processor 110 estimates the installation location of the display device 100 as the installation location (1). Further, in step S209, the processor 110 estimates the installation location of the display device 100 as the installation location (3). Then, steps S206, S208, and S209 are followed by step S101 of FIG. 11.

That is, when the direction of the driver's face in the image captured by the imaging device 102 is rightward, the processor 110 estimates the installation location of the display device 100 as the installation location (1). On the other hand, when the direction of the driver's face in the image captured by the imaging device 102 is leftward, the processor 110 estimates the installation location of the display device 100 as the installation location (3). Further, when the direction of the driver's face in the image captured by the imaging device 102 is the front direction, the processor 110 estimates the installation location of the display device 100 as the installation location (2).

Figure 12:
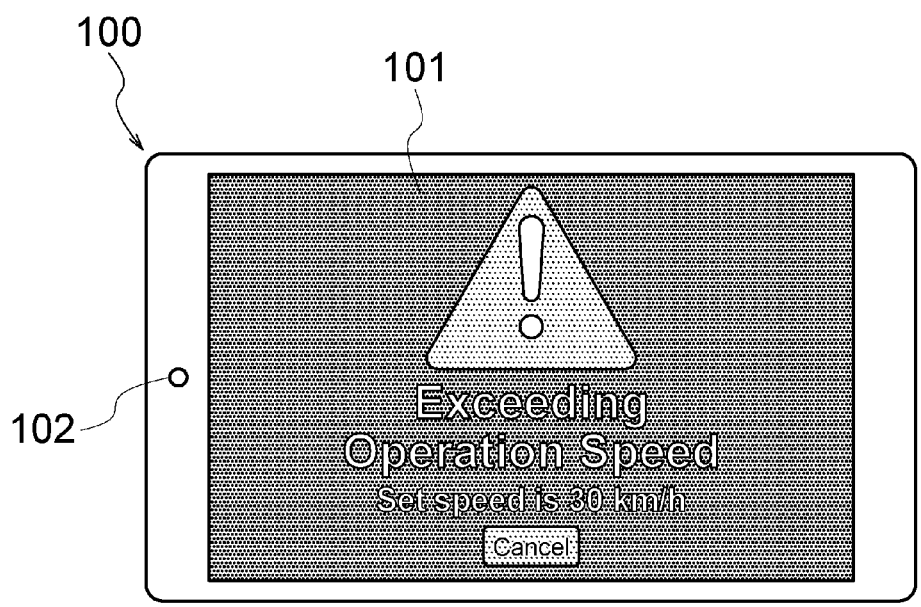
FIG. 12 is a view illustrating a display image corresponding to Disp=1 of one or more embodiments of the present invention.

After steps S206, S208, and S209, the above-described steps S101 to S104 are executed. FIG. 12 is a view illustrating the display image corresponding to Disp=1 of one or more embodiments of the present invention, FIG. 5 is a view illustrating the display image corresponding to Disp=2 of one or more embodiments of the present invention, and FIG. 6 is a view illustrating the display image corresponding to Disp=3 which will be described later.

As illustrated in FIG. 12, the display image corresponding to Disp=1 of one or more embodiments of the present invention includes abstracted information such as an icon and materialized information such as a text. On the other hand, as illustrated in FIG. 5, the display image corresponding to Disp=2 of one or more embodiments of the present invention includes only abstracted information such as an icon. Further, as illustrated in FIG. 6, the display image corresponding to Disp=3 of one or more embodiments of the present invention includes only materialized information such as a text. Here, the abstracted information refers to event occurrence notification information for notifying that an event such as speeding occurs. On the other hand, the materialized information refers to occurred event content notification information for notifying the contents of the occurred event.

Referring again to the flowchart of FIG. 11, in step S105, the processor 110 determines whether or not an event to be displayed on the display unit 101 for notification occurs, on the basis of the vehicle information acquired from the communication unit 20. An affirmative determination in step S105 is followed by step S106 while a negative determination in step S105 is followed by step S109.

In step S106, the processor 110 determines whether or not the setting of information to be displayed on the display unit 101 is Disp=1. An affirmative determination in step S106 is followed by step S301 while a negative determination in step S106 is followed by step S302.

In step S301, the processor 110 creates an image corresponding to Disp=1 as illustrated in FIG. 12 and controls the display unit 101 to display the image. On the other hand, in step S302, the processor 110 determines whether or not the installation location of the display device 100 is any one of the installation locations (1) and (3). An affirmative determination in step S302 is followed by step S303 while a negative determination in step S302 is followed by step S306.

In step S303, the processor 110 creates an image corresponding to Disp=2 as illustrated in FIG. 5 and controls the display unit 101 to display the image. Likewise, in step S306, the processor 110 creates an image corresponding to Disp=2 and controls the display unit 101 to display the image. That is, the display unit 101 is controlled to display the abstracted information (event occurrence notification information) both when the display device 100 exists within the peripheral visual field region P and when the display device 100 does not exist within the peripheral visual field region P.

After execution of step S303, the processor 110 determines whether or not a predetermined time (e.g. a time of 1 sec or less such as 0.5 sec) has passed (step S304). Step S304 is repeated until an affirmative determination is made, and the affirmative determination in step S304 is followed by step S305.

In step S305, the processor 110 creates an image corresponding to Disp=3 as illustrated in FIG. 6 and controls the display unit 101 to display the image. That is, when the display device 100 exists within the peripheral visual field region P of the driver, the display information of the display unit 101 is switched from the abstracted information to the materialized information after the abstracted information is displayed on the display unit 101 for the predetermined time (a time of 1 sec or less). On the other hand, when the display device 100 is absent not only in the central visual field region C of the driver but also in the peripheral visual field region P, the abstracted information is continuously displayed on the display unit 101 even after the above predetermined time has passed (step S306).

After execution of steps S301, S305, and S306, the processor 110 determines whether or not the ignition switch is OFF (step S109). When an affirmative determination is made in step S109, the processor 110 terminates the application software and terminates the process. On the other hand, when a negative determination is made in step S109, the routine returns to step S201 of FIG. 10 to repeat the process.

In one or more embodiments of the present invention, even when the display unit 101 does not exist within the peripheral visual field region P, the display unit 101 is controlled to display the notification information in the second display form having a high abstraction level, but this is not essential, and the notification information may not be displayed on the display unit 101 when the display unit 101 exists neither within the central visual field region C nor the peripheral visual field region P.

As described above, in the vehicular information display system 11 according to one or more embodiments of the present invention, when the display unit 101 of the display device 100 falls within the peripheral visual field region P, the notification information is displayed on the display unit 101 in the second display form such as an icon having a high abstraction level, and after the predetermined time then passes, the display form is switched to the first display form having a high materiality level to display the notification information on the display unit 101. This allows the driver to turn the line of sight to the occurred event content notification information having a high materiality level in a state of recognizing the event occurrence notification information having a high abstraction level in the peripheral visual field. It is therefore possible to shorten the time for recognition of the occurred event content notification information having a high materiality level.

In the vehicular information display system 11 according to one or more embodiments of the present invention, the driver's face is imaged by the imaging device 102 provided on the surface of the display device 100 on which the display unit 101 is provided, and the location of the display unit 101 is estimated on the basis of the direction of the imaged driver's face. When the estimated position of the display unit 101 falls within the peripheral visual field region P, the notification information is displayed on the display unit 101 in the second display form such as an icon having a high abstraction level, and after the predetermined time then passes, the display form is switched to the first display form having a high materiality level to display the notification information on the display unit 101. This can prevent the display form of the notification information from being unnecessarily switched when the display unit 101 does not fall within the peripheral visual field region P.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in one or more of the above-described embodiments, the imaging device 102 is integrated with the display device 100, but this is not essential. For example, the imaging device 102 may be provided around the display device 100 as a separate body from the display device 100, such as by providing the imaging device 102 on the fixing device 4 for fixing the display device 100. In one or more embodiments of the present invention, the imaging device 102 is provided in the vicinity of the display device 100. Here, when the imaging device 102 is provided "around" or "in the vicinity of" the display device 100 as a separate body from the display device 100, the distance between the imaging device 102 and the display device 100 may be set such that the relationship between the display device 100 and the visual field of the user is the same as that in the case of integrating the imaging device 102 with the display device 100. The case in which "the relationship between the display device 100 and the visual field of the user is the same" refers to a situation in which the display device 100 exists within the central visual field region C of the user both when the imaging device 102 is integrated with the display device 100 and when the imaging device 102 is a separate body from the imaging device 102, or a situation in which the display device 100 exists within the peripheral visual field region P of the user both when the imaging device 102 is integrated with the display device 100 and when the imaging device 102 is a separate body from the imaging device 102. The term "around" as used herein refers to a case of arranging the imaging device 102 apart from the display device, for example, at a location at which the central visual field and peripheral visual field of the user are perceivable with respect to the display device 100. The term "in the vicinity" as used herein refers to a case of arranging the imaging device 102 adjacent to the display device 100 so that, for example, they are in contact with each other.

The display unit 101 is not limited to a unit that displays one notification information item such as a warning information item exclusively, and may also be a unit that displays navigation information or the like as basic information and temporarily displays notification information such as warning information.

In one or more of the above-described embodiments, when the notification event occurs, a determination is made as to whether the display unit 101 exists within the central visual field region C or the peripheral visual field region P, to determine the display form of the notification information, but this is not essential. In an alternative embodiment, when the notification event occurs, the display unit 101 may be controlled to display the notification information in a predetermined display form, and after the notification event occurs, a determination may be made as to whether the display unit 101 exists within the central visual field region C or the peripheral visual field region P, and the display form of the notification information may be switched on the basis of the determination result.

In one or more of the above-described embodiments, an exemplary situation is described in which the display device 100 is disposed in front of the driver in the vehicle, but the present invention can also be applied to situations in which the display device 100 is used for a ship, an aircraft, or a machine other than vehicles, such as construction machinery, or used in an office.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

30 Server
310 Processor
100 Display device
101 Display unit
102 Imaging device
110 Processor

The invention claimed is:

1. A method of displaying information on a display of a display device via a display controller, comprising:
   imaging a user of the display device using an imaging device integrated with the display device or provided around the display device;
   detecting a line of sight of the user from an image captured by the imaging device;
   determining whether the display exists within a central visual field region centered on the detected line of sight of the user or within a peripheral visual field region located outside the central visual field region;
   displaying notification information on the display in a first display form when the display exists within the central visual field region;
   displaying the notification information on the display in a second display form when the display exists within the peripheral visual field region, the second display form having a higher abstraction level than that in the first display form; and
   when the display exists within the peripheral visual field region, after a predetermined time passes from when the notification information is displayed on the display in the second display form, switching the second display form to the first display form to display the notification information on the display.

2. The method according to claim 1, further comprising:
   providing the imaging device on a surface of the display device on which the display is provided,
   imaging a face of the user by the imaging device,
   estimating a location of the display based on a direction of the user's face imaged by the imaging device, and
   when the estimated location of the display exists within the peripheral visual field region, after a predetermined time passes from when the notification information is displayed on the display in the second display form, switching the second display form to the first display form to display the notification information on the display.

3. The method according to claim 2,
   wherein the first display form includes a text, and
   wherein the second display form includes an icon.

4. The method according to claim 2, further comprising:
   disposing the display device in front of a driver's seat in a vehicle,
   wherein the notification information is information to be notified to a driver of the vehicle.

5. The method according to claim 1,
   wherein the first display form includes a text, and
   wherein the second display form includes an icon.

6. The method according to claim 5, further comprising:
   disposing the display device in front of a driver's seat in a vehicle,
   wherein the notification information is information to be notified to a driver of the vehicle.

7. The method according to claim 1, further comprising:
   disposing the display device in front of a driver's seat in a vehicle,
   wherein the notification information is information to be notified to a driver of the vehicle.

8. A display control device comprising:
   a processor programmed to:
   control a display device to display notification information on a display of the display device;
   control an imaging device to image a user of the display device, the imaging device being integrated with the display device or provided around the display device;
   detect a line of sight of the user from an image captured by the imaging device;
   determine whether the display of the display device exists within a central visual field region centered on the detected line of sight of the user or within a peripheral visual field region located outside the central visual field region;
   display the notification information on the display in a first display form when the display exists within the central visual field region; and
   display the notification information on the display in a second display form when the display exists within the peripheral visual field region, the second display form having a higher abstraction level than that in the first display form,
   wherein, when the display exists within the peripheral visual field region, after a predetermined time passes from when the notification information is displayed on the display in the second display form, the second display form is switched to the first display form to display the notification information in the second display form on the display.

* * * * *